United States Patent
Kornback

(10) Patent No.: US 6,213,440 B1
(45) Date of Patent: Apr. 10, 2001

(54) ENSIGN MOUNT FOR VEHICLES

(76) Inventor: Christer Kornback, Forshagagatan 7, Farsta (SE), 123 33

( * ) Notice: Subject to any disclaimer, the term of this patent is extended or adjusted under 35 U.S.C. 154(b) by 0 days.

(21) Appl. No.: 09/180,371

(22) PCT Filed: May 9, 1997

(86) PCT No.: PCT/SE97/00768

§ 371 Date: Nov. 9, 1998

§ 102(e) Date: Nov. 9, 1998

(87) PCT Pub. No.: WO97/42618

PCT Pub. Date: Nov. 13, 1997

(30) Foreign Application Priority Data

May 9, 1996 (SE) .................................................... 9601804

(51) Int. Cl.$^7$ .................................................... F16M 13/00
(52) U.S. Cl. ........................ 248/514; 248/537; 248/538; 248/539; 248/467; 248/206.5
(58) Field of Search .................................... 248/514, 537, 248/206.5, 467, 538, 539, 291.1, 292.12

(56) References Cited

U.S. PATENT DOCUMENTS

| | | | |
|---|---|---|---|
| 2,659,169 | * 11/1953 | Brennan | 248/537 |
| 3,082,982 | * 3/1963 | Moskowitz | 248/537 |
| 3,241,516 | 3/1966 | Hopkins | 116/173 |
| 3,245,165 | * 4/1966 | Podoloff | 248/467 X |
| 3,333,802 | * 8/1967 | Goodman | 248/539 X |
| 4,144,833 | 3/1979 | Newman, Sr. | 116/28 PR |
| 4,293,860 | 10/1981 | Iwata | 343/715 |
| 4,574,726 | 3/1986 | Sullivan | 116/28 R |
| 4,633,215 | 12/1986 | Anders et al. | 340/84 |
| 4,700,655 | * 10/1987 | Kirby | 248/537 |
| 4,998,091 | 3/1991 | Rezmer | 340/384 E |
| 5,388,546 | 2/1995 | Lombard | 116/209 |
| 5,585,809 | * 12/1996 | Yajima et al. | 248/206.5 X |
| 5,727,583 | * 3/1998 | Kennedy | 248/514 X |

* cited by examiner

Primary Examiner—Leslie A. Braun
Assistant Examiner—A. Joseph Wujciak
(74) Attorney, Agent, or Firm—Jacobson, Price, Holman & Stern, PLLC

(57) ABSTRACT

A mount for supporting an object, such as an ensign post, on the outside of a vehicle body includes a base plate (20) which carries magnetic means (20, 21) for releasably securing the mount to the vehicle body magnetically. The base plate (20) carries a pivotally mounted object-receiving holder (40, 41). The magnetic means (20, 21) disposed in a ring around the circumference of the base plate (20) and adapted to interact with the vehicle body. Adjacent magnets in the circumferential direction of the ring are arranged with alternating magnetic poles facing towards the base plate.

4 Claims, 1 Drawing Sheet

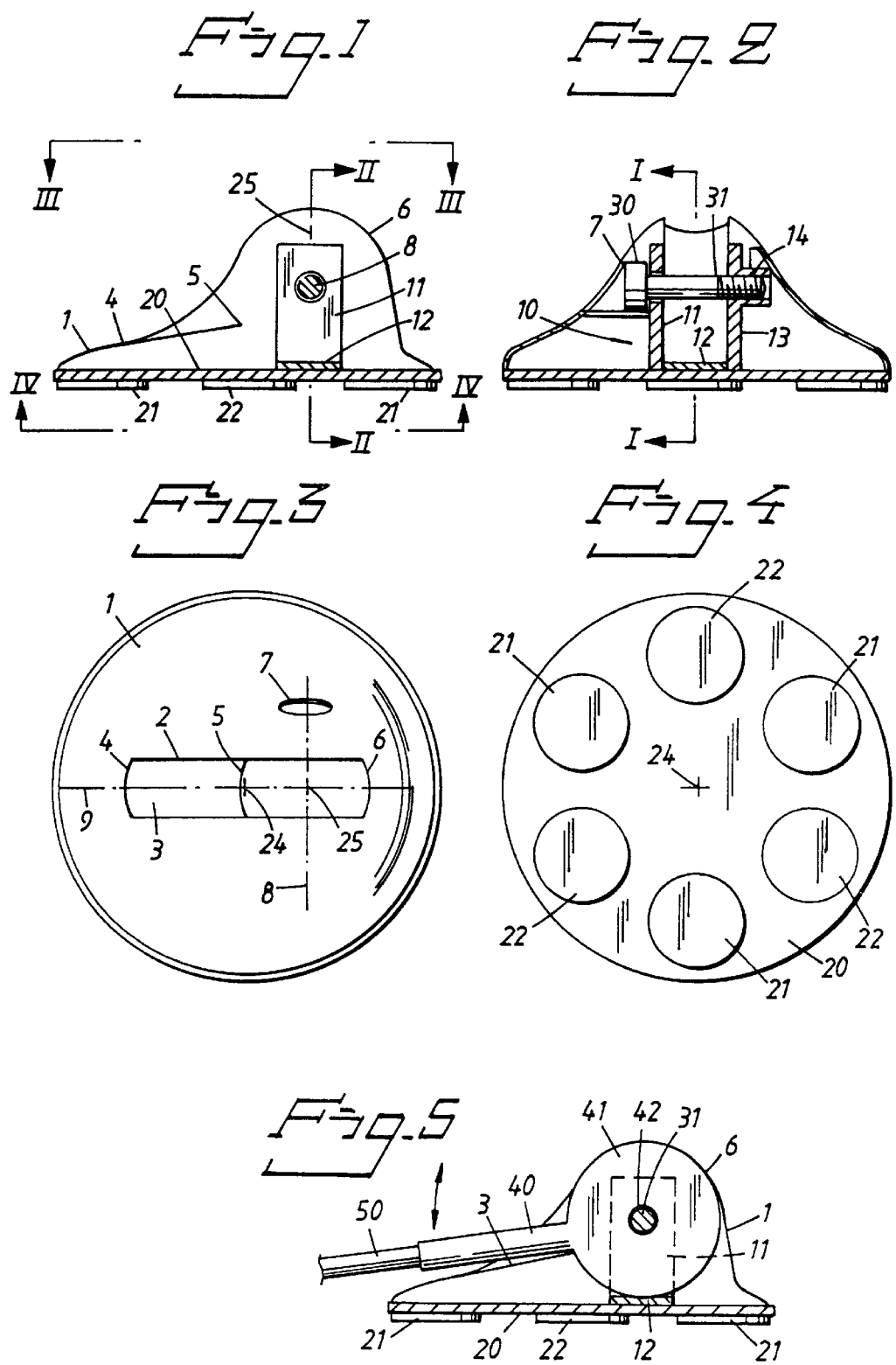

ENSIGN MOUNT FOR VEHICLES

BACKGROUND OF THE INVENTION

FIELD OF THE INVENTION

The present invention relates to a mount of the kind defined in an ensign post on the outside of a vehicle body, wherein the mount includes a base plate that carries magnetic devices for releasably anchoring the mount magnetically to the vehicle body, and wherein the base plate carries a pivotally mounted holder for holing an object.

The invention thus relates to a mount for supporting, e.g. a flag post, with or without a flag, or ensign, for instance on the outside of a front fender, or mudguard, of an automobile, wherein the mount is of the kind that includes a base plate which has magnet means for enabling the mount to be removably attached magnetically to the vehicle body when said body is made of steel or like material. The base plate also carries a flag post holder.

An ensign mount of this general kind has been developed and marketed by the company Profile 4U, Flygplatsinfarten 6A, 161 69 Bromma, Sweden.

This known mount includes a single flat, ring-shaped magnet whose one flat main surface is intended to lie plane-parallel with and in close proximity to the mounting surface on the vehicle body. The mount support surface is covered with a rubber fabric.

One drawback with this known mount is that it tends to twist on its abutment surface. The support surface of the ensign mount normally lies against a vertically orientated side surface of a vehicle fender, wherein the post stands vertically in the mount. The slipstream acting on the ensign carried by the post subjects the mount to a strong turning moment, or torque.

It is also known from practice to construct the mount from an elongated base plate with a magnet at each end thereof. Each magnet is coupled to a yoke which supports against the mounting surface and forms a protective cover for the magnet. Such arrangements are expensive and do not provide any substantial co-action between the magnets.

SUMMARY OF THE INVENTION

The object of the invention is to provide an improved magnetic ensign mount which can be given a small round base area and still provide a high torque resistance in its abutment plane.

This object is achieved in accordance with the invention with a mount according to an ensign post on the outside of a vehicle body, wherein the mount includes a base plate that carries magnetic devices for releasably anchoring the mount magnetically to the vehicle body, and wherein the base plate carries a pivotally mounted holder for holing an object, characterized in that the magnetic means includes at least two magnets disposed in a ring around the circumference of the base plate and adapted to interact with the vehicle body; and in that adjacent magnets in the circumferential direction of the ring are arranged with alternating magnetic poles facing towards the base plate.

Further developments of the inventive mount are defined in the dependent claims.

The invention is fundamentally based on a magnetic device that includes at least two, and preferably at least four magnets disposed in a ring around the circumference of the base plate, wherein the poles of the magnets that face towards the mount abutment surface are arranged in an alternating fashion in the circumferential direction of the ring. This enables adjacent magnets to interact in a manner which not only holds the mount strongly against the mount abutment surface but also gives the mount a strong resistance against rotation about the centre of the ring. The base plate may be made of steel or some other ferromagnetic material, and the magnets may be glued to the base plate or fastened thereto in some other suitable way. The base plate may be resiliently flexible so as to enable it to conform to the curved shapes of the underlying surface. The magnets may be cylindrical with a height which is only a fraction of the diameter, for instance a tenth thereof.

In one preferred embodiment of the invention, six magnets are mounted around the circumference of the base plate, the spacing between the magnets in the circumferential direction being slightly smaller than half the diameter of the magnets.

The base plate carries a mount which includes two parallel legs. Each leg has a hole and the holes are coaxial. The hole in one of the legs has a screw thread which permits a bolt to support against the outside of one leg, with the stem of the bolt extending through the one hole and with an external thread at its other end for co-action with an internal thread in the other leg opening so that the legs will be drawn towards one another when tightening the bolt. Positioned between the legs is a cylindrical hollow plate through which the bolt stem extends. This cylindrical plate carries on its periphery a radially extending holder means which receives coaxially the bottom end of an object, such as an ensign post.

The plate and the holder means are covered by a casing having a slot-like opening for receiving the ensign mount, wherein the opening is configured to enable the post to be raised from a position in which it is generally parallel with the base plate to a position in which it is generally perpendicular to the base plate. The tightening bolt enables the cylindrical plate mounted on the bolt to be releasably fixed in chosen angular positions. The casing has an opening which provides access to the head of the bolt, to this end. The bearing point of the mount, defined by the bolt stem, is spaced from the centre of the ring of magnets such that the bearing bolt lies in a region vertically beneath the centre of the ring of magnets when the object carried by the holder is vertically orientated and extends upwards from the mount, and when the base plate of the mount is vertically orientated. This design reduces the force exerted by an object in the form, e.g., of an ensign post carrying a flag exerts on the mount, in proportion to the vertical distance between the centre of the ring and the bolt access.

The invention will now be described in more detail with reference to an exemplifying embodiment and also with reference to the accompanying drawing.

BRIEF DESCRIPTION OF THE DRAWINGS

FIG. 1 is a schematic sectional view of an inventive ensign mount.

FIG. 2 is a schematic sectional view taken on the line II—II in FIG. 1.

FIG. 3 is a view taken on the line III—III in FIG. 1.

FIG. 4 is a view taken on the line IV—IV in FIG. 1.

FIG. 5 is a view corresponding to the view of FIG. 1, but with an ensign holder fitted in the mount.

FIG. 5 shows the lower end of an ensign post 50 which is connected coaxially with a shaft 40 that extends radially from a cylindrical holder disc 41, and also shows a bearing bolt 31 extending through a centre hole 42 in the disc 41.

DETAILED DESCRIPTION OF THE DRAWINGS

As will be evident from FIGS. 1 and 2, the bolt 31 is mounted in a U-shaped member 10 having two mutually parallel legs 11, 13 between which the holder disc 41 fits with a small clearance. The leg 11 has an opening for receiving the bolt stem 31, and the leg 13 has an opening provided with an internal thread 14 and lying coaxial with the opening in the leg 11, said internal thread 14 co-acting with an external thread on the end of the bolt 31. The bolt head rests against the outside of the leg 11. The disc 41 can therewith be fixed in a chosen closing position by tightening the bolt 31 and thereby clamping the disc between the legs 11, 13. The legs 11, 13 are interconnected by a web 12 attached to the base plate 20 of the mount. The base plate 20, the U-shaped member 10 and the bolt 31 are housed in a casing 1 that includes an opening for the ensign post holder 40, 41, as evident from FIGS. 1–3. The slot-like opening in the casing 1 defines a ramp 3 which, in turn, defines one end position of the post connecting member 40, and has a rear edge 6 which defines the other end position for pivotal movement of the member 40. The inner end-edge of the ramp 3 is referenced 5 and its front edge is referenced 4.

The casing 1 also has an opening 7 which permits access to the bolt head 30. As will be seen from FIG. 3, the bolt axis 8 is spaced from the centre 24 of the circular base plate 20.

FIG. 4 shows six magnets 21, 22 spaced equidistantly around a circular arc whose centre coincides with the centre of the circular base plate 20. The magnets 21, 22 are mutually identical although their pole orientation is inverted so that mutually adjacent magnets around the circumference of the base plate will have alternating pole orientations. The base plate 20 is preferably made of steel or some other ferromagnetic material, at least with respect to the outer surface that borders on the magnets 21, 22. The base plate 20 may conveniently be elastically deformable under the action of the holding forces of the magnets 21, 22 against a steel surface, such as a steel vehicle fender or mudguard, so as to enable the plate 20 to be deformed and the magnets 21, 22 to lie closer to the underlying surface and therewith hold the mount more stably.

A thin rubber plate may be fitted over the underside of the mount so as to cover the magnets 21, 22 (and the underside of the plate 20), said rubber plate preferably being chosen to provide good frictional contact with both a vehicle fender and against the adjacent magnet surfaces.

Normally, the base plate 20 of the mount will be orientated generally vertically so as to lie against one side of a vehicle fender or mudguard. In this position of the base plate, the slot 2 will have a vertical orientation with the axis of the bearing 8 spaced vertically beneath the centre 24 of the plate 20 and of the ring of magnets 21, 22.

The base plate carries at least two magnets, and preferably at most four magnets, or a greater even number of magnets, said magnets preferably being spaced equidistantly from one another. The magnets are preferably disposed so as to touch or lie immediately inwards of the edge of the base plate. The distance between adjacent magnets will preferably at the most be equal to the dimensions of the magnets in the circumferential direction of the ring, and preferably less than half of this dimension.

What is claimed is:

1. A mount for supporting an object, said mount comprising: an ensign post for positioning on the outside of a vehicle body, wherein the mount includes a ferromagnetic base plate carrying magnetic devices, said magnetic devices for releasably anchoring the mount magnetically to the vehicle body, and wherein the base plate carrying said magnetic devices having a pivotally mounted holder for holding an object, and said magnetic devices including at least two magnets disposed in a ring around the circumference of the base plate and, said at least two magnets adapted to interact with the vehicle body; and said at least two adjacent magnets positioned in the circumferential direction of the ring are arranged with alternating magnetic pole orientations facing towards the base plate for interacting with each other and with said ferromagnetic base to further anchor the mount magnetically to the vehicle body.

2. A mount according to claim 1, wherein the holder is pivotally mounted on the base plate for movement in a plane between a first object direction which is generally parallel with the base plate and a second object direction which is generally parallel with the normal direction of the base plate; and latching means for latching the holder in a chosen pivoted position.

3. A mount according to claim 2 wherein when seen in the plane of the base plate the pivot axis of the holder is spaced from the centre of the ring of magnets, wherein the bearing axis of the holder is located beneath the centre of the ring (when the plate is vertically orientated and the ensign post extends vertically upwards from the bearing axis).

4. A mount according to claim 1, wherein the holder is pivotally mounted on a through-passing bolt carried by two parallel legs, wherein the bolt, when tightened, functions to draw the legs of the U-shaped member towards one another and into frictional engagement with mutually opposing side surfaces of the holder, such as to lock the holder in a chosen direction.

* * * * *